United States Patent [19]
Young

[11] Patent Number: 6,000,094
[45] Date of Patent: Dec. 14, 1999

[54] REPLACEABLE FILTER FOR USE IN CLEANING BUCKETS

[75] Inventor: Ronald Scot Young, St. Joseph, Mo.

[73] Assignee: Scot Young Research, Inc., St. Joseph, Mo.

[21] Appl. No.: 09/076,304

[22] Filed: May 7, 1998

[51] Int. Cl.⁶ ............................ A47L 13/12; A47L 13/14
[52] U.S. Cl. ............................ 15/264; 15/260; 210/477; 210/489; 210/492
[58] Field of Search .................. 15/260–264, 257.01; 210/477, 482, 489, 492; 220/501, 529

[56] References Cited

U.S. PATENT DOCUMENTS

| | | | |
|---|---|---|---|
| 1,488,930 | 4/1924 | Mannix | 15/264 |
| 2,712,668 | 7/1955 | Thiele | 15/264 |
| 3,076,994 | 2/1963 | Zimmerman | 15/264 |
| 4,161,799 | 7/1979 | Sorrells | 15/260 |
| 4,344,201 | 8/1982 | Trisolini . | |
| 4,798,307 | 1/1989 | Evrared | 15/264 |
| 4,878,264 | 11/1989 | Young | 15/264 |
| 5,411,661 | 5/1995 | Heiligman | 210/489 |

FOREIGN PATENT DOCUMENTS

| | | |
|---|---|---|
| 0 311 360 | 4/1989 | European Pat. Off. . |
| 450798 | 7/1936 | United Kingdom . |
| 1520839 | 8/1978 | United Kingdom . |
| 2239388 | 7/1991 | United Kingdom . |
| 2260691 | 4/1993 | United Kingdom . |

*Primary Examiner*—Terrence R. Till
*Attorney, Agent, or Firm*—Wm. Bruce Day

[57] ABSTRACT

A removable and replaceable filter and filter holder is mounted within a mop cleaning bucket to receive dirt settling under gravity from the contained liquid with the dirt collecting in, and passing through so as to be trapped below, the filter and its holder. The holder is a rigid or substantially rigid perforated support structure spaced above and below the dirt receiving filter. In one embodiment, the holder is supported in the bucket in spaced relationship to the bottom of the bucket and protects the filter. The filter is a thin, sturdy, semi-rigid and floatable member with many holes so soiled water passes through and collects in the bottom of the bucket. The construction of the filter can be selected depending upon the material (grease sludge, dirt, oil, soot, or food particles) to be mopped up. The combination of the filter and filter holder blocks or dampens turbulence and prevents sediment from being stirred up in the bottom portion of the bucket. In the absence of the present invention, sediment could rise upwardly and mix with cleaner water above the filter and filter holder and which is reserved for mop cleaning and rinsing.

7 Claims, 2 Drawing Sheets

U.S. Patent    Dec. 14, 1999    Sheet 1 of 2    6,000,094 exactly 6,000,094

REPLACEABLE FILTER FOR USE IN CLEANING BUCKETS

FIELD OF THE INVENTION

The invention relates to cleaning buckets, such as a mop bucket in which cleaning liquid is used to saturate and rinse out cleaning devices, such as a mop, and particularly to devices for filtering or holding soil which may be mounted within the bucket.

BACKGROUND OF THE INVENTION

A problem often encountered with the use of cleaning buckets is that dirt deposited out from the mop bucket liquid collects at the bottom of the container and that turbulence of the liquid, as when rinsing out a mop, washes the dirty water back into the main body of liquid where it may again be absorbed into the mop. The mop then spreads soil back out on the floor, leaving unsightly streaks and leading to incomplete cleaning. In an attempt to alleviate this problem, the mop bucket is too often emptied and cleaned out before any cleaning additives that may have been put into the liquid have been exhausted.

The problem is twofold. First is the difficulty of separating heavy soil components such as dirt or grease attached to dirt, from cleaner water in the mop bucket. The second difficulty is turbulence within the water caused by the swishing of the mop within the bucket or residual sloshing movement of water after the bucket has been moved. The turbulence tends to disturb soil, sludge and other heavy components of dirty water and evenly distribute them within the body of water to be picked up again when the mop is rinsed in the bucket, even if care is taken not to push the mophead all the way down to the bottom of the bucket.

According to the present invention there is provided a filter and filter holder assembly for inserting into a container for cleaning liquid such as a mop bucket. The assembly includes spaced filter holders of rigid grid material which are separated a sufficient distance to permit a sturdy, semi-rigid and floatable filter element to move there between. The filter element permits soil laden water to pass through freely. The free floating action of the filter element between the two grid holders provides a damping function to water disturbance waves in order to reduce turbulence that would stir sediment upwardly from the bottom of the bucket.

The support grids protect the filter element. The combination of the support grids and filter element blocks turbulence and prevents dirt from being stirred up at the base of the bucket. Under certain circumstances, such as mopping up large particles, the support grids without the middle filter element may work satisfactorily. Also, powders used for cleaning can be placed in self dissolving packets beneath the support grids and the support grids will prevent any residue of the packets from coming into contact with a mophead or other cleaning element.

This invention is related to a patent owned by the assignee's related company, U.S. Pat. No. 4,878,264. An embodiment of that invention positions a filter element at the bottom of a mop bucket in or to absorb soil material and reduce its capacity to be stirred up into relatively clean mop water. This liquid filter arrangement is directed to hard grit and dirt particles which are induced by chemical means to be forced out of suspension. However, grease and sludge cannot generally be forced out of suspension by the use of normal cleaning chemicals in a mop bucket and generally cannot be forced below the bottom eight inches of water solution in the bucket.

OBJECTS OF THE INVENTION

The objects of the invention are: to provide a removable filter and filter holder for emplacement within a mop bucket or other suitable container; to provide such a filter and filter holder that will allow dirt or soil laden water to pass through to a lower part of the bucket and away from a mop placed in the bucket for rinsing; to provide such a filter and filter holder that will provide a damping effect to reduce turbulence in the water in a mop bucket and reduced soil laden water from being stirred up; and to provide such a filter and filter holder that is economical to produce, easy to install, effective in use, and well suited for the purposes for which it is intended.

DESCRIPTION OF THE PREFERRED AND ALTERNATE EMBODIMENTS

As required, detailed embodiments follow and disclose particular forms of the invention as examples of how the invention may be configured. However, it is foreseen that other designs and configurations may be formed according to the invention without departing from the scope of the invention.

Figure 1:
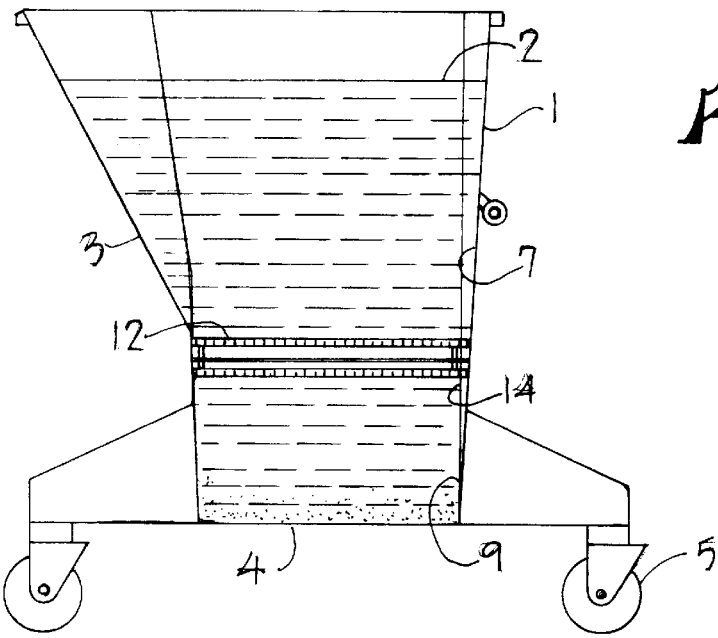
FIG. 1 is a vertical sectional view of a mop bucket and having a filter and filter holder embodying the present invention mounted therein.

Referring to FIG. 1, a bucket 1 contains a cleaning liquid 2 for use in a cleaning operation, for example, mopping a floor. The liquid 2 is generally water and various detergents, germicides and the like.

The bucket 1 has a peripheral wall 3, a bottom 4 and wheels 5 for movement about a floor. Generally within the bucket 1 is an upper portion 7 and a bottom or sump portion 9.

A unitary filter and filter holder 12 is mounted within the bucket 1 and comprises an example of the instant invention. The unitary filter and filter holder 12 divides the bucket 1 into the upper and sump portions 7 and 9 and is positioned within the bucket 1 by various means including dimension selection to provide an interference fit. The bucket 1 may also include an inner ridge 14, as shown in FIG. 1, which provides a ledge for the unitary filter and filter holder 12 to rest upon. Ideally, the filter and filter holder 12 is positioned within the bucket 1 so that there is about 8 inches of water depth in the sump portion 9. This space provides a sufficient depth to permit sludge and heavy dirt particles to settle out and not be affected by normal turbulence of water flow in the bucket 1, as would be caused by rinsing out a mop within the bucket. The preferred 8" depth with the filter and filter holder 12 dividing the sump portion 9 from the upper portion 7 provides an area of sludge and dirty water accumulation generally separated from cleaner water where the mop is to be rinsed.

Figure 2:
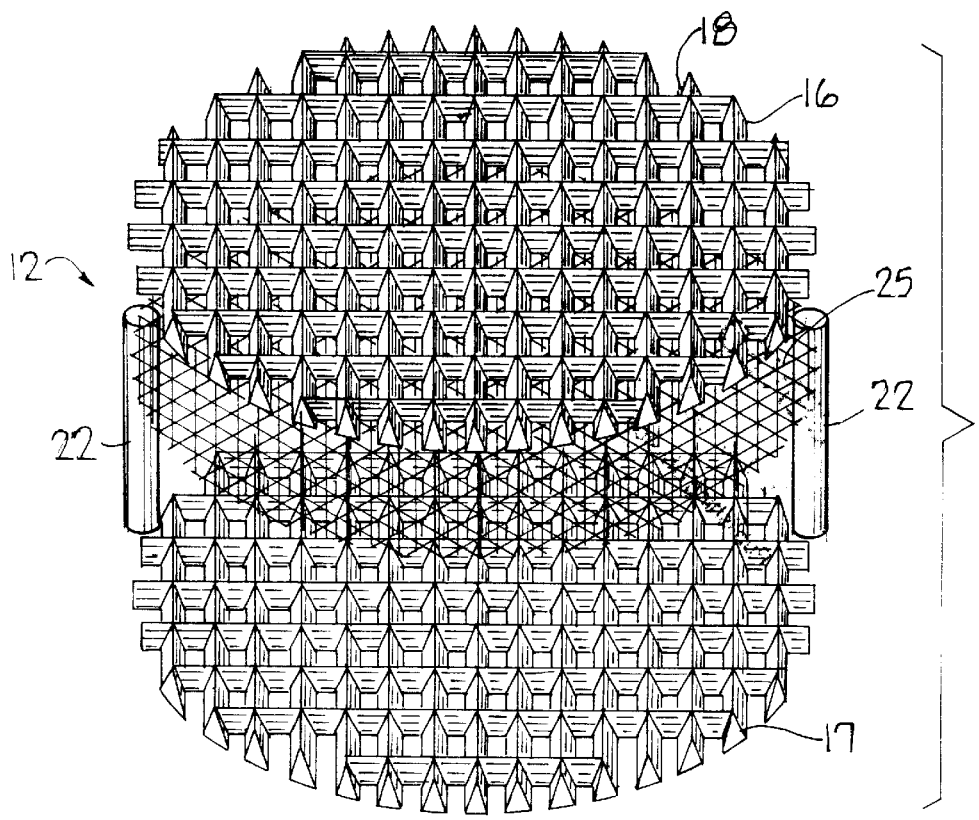
FIG. 2 is perspective, disassembled view of the proponents of a preferred embodiment of the filter and filter holder.

The filter and filter holder 12 is formed of upper and lower grid-like structures 16 and 17, FIG. 2. Each grid-like structure 16 or 17 is of rigid or substantially rigid material, typically a plastic material and has holes 18 therethrough. In the illustrated example, these are tapered in a downwardly direction and of truncated pyramidical shape so as to direct dirt or soil downward and through the grid. As shown in FIG. 2, the grid-like structure 16 or 17 is circular in shape but it is intended that they match the shape of the bucket 1. The grid-like structures 16 and 17 are held in loosely spaced relation, for example, approximately 1 inch apart, to create a substantial space 20 therebetween. To maintain spacing, legs 22 extend between the top and bottom grid-like structures 16 and 17 although other types of spacing means may be used as necessary.

A filter element 25 of sturdy yet semi-flexible construction is trapped between the grid-like structures 16 and 17. Preferably, the filter element 25 is of thin nylon or polyethylene mesh material having a plurality of fine openings therethrough which are of sufficient size to allow fine soil or sludge rinsed out of a mop in the upper portion 7 of the bucket 1 to settle down through the filter and filter holder 12 to the sump portion 9 in the bottom of the bucket, as designated by the vertical wavy lines in FIG. 3. The filter element 25, because of its thinness, in the order of $\frac{1}{32}$ inch, flexes under the influence of current created by the wringing agitation of a mop within the bucket. This agitation causes an up and down and wavy motion, of the filter element 25 between the grid-like structures 16 and 17 which provides a dampening effect to reduce the effects of turbulence within the bucket 1. Turbulence can cause undue stirng up of sludge or other soil constituents from the bucket bottom portion 9 which, if unchecked, could cause the water in the top portion 7 to become turgid and dirt and sludge laden. Thus, when the mop is rinsed out under such conditions, it is rinsed dirty and dirty water is spread back out onto the floor. This leaves steaks, fails to clean the mop, leading to bacterial breakdown of the mop fibers, and leaves a soil and bacterial film on the floor. As this incomplete cleaning is unsuitable, particularly in a food service establishment, operators normally change the mop water frequently, pouring down the drain still potent cleaners, detergents and disinfectants. The present invention provides a means to effectively segregate soil laden sump water from cleaner mop wash and rinse water within the same bucket.

The filter element 25 can be made in several grades with different sizes of pores, or different degrees of rigidity, depending on varying conditions. The flexibility of the filter 25 allows larger dirt particles which have collected in the filter to be knocked off as the filter flexes, thereby providing a self cleaning action.

Powders used for cleaning can be placed in self dissolving packets beneath the filter and filter holder 12, which will prevent any residue of the packets from coming into contact with a mophead or other cleaning element. This prevents any substance being transferred from the mop to the floor where it would have caused an unsightly or unsafe film or residue to result.

The powdered chemical can be any powdered cleaner or disinfectant. Powdered chemicals are more environmentally friendly than liquid chemicals because the film packet containig the chemical dissolves. Also, an exact measure can be provided, which prevents excessive use of the chemical.

The filter and filter holder 12 is relatively inexpensive and is replaceable if it becomes excessively fouled during use. While it is easily self cleaning and may be manually cleaned after, its low cost construction and ease of removal makes replacement feasible.

The embodiment described above is given by way of example only and various modifications will be apparent to persons skilled in the art without departing from the scope of the invention. For example, the holes in the grid-like structure 16 and 17 could be of other appropriate shape. Also the filter element 25 could be of open-cell foam material.

Figure 3:
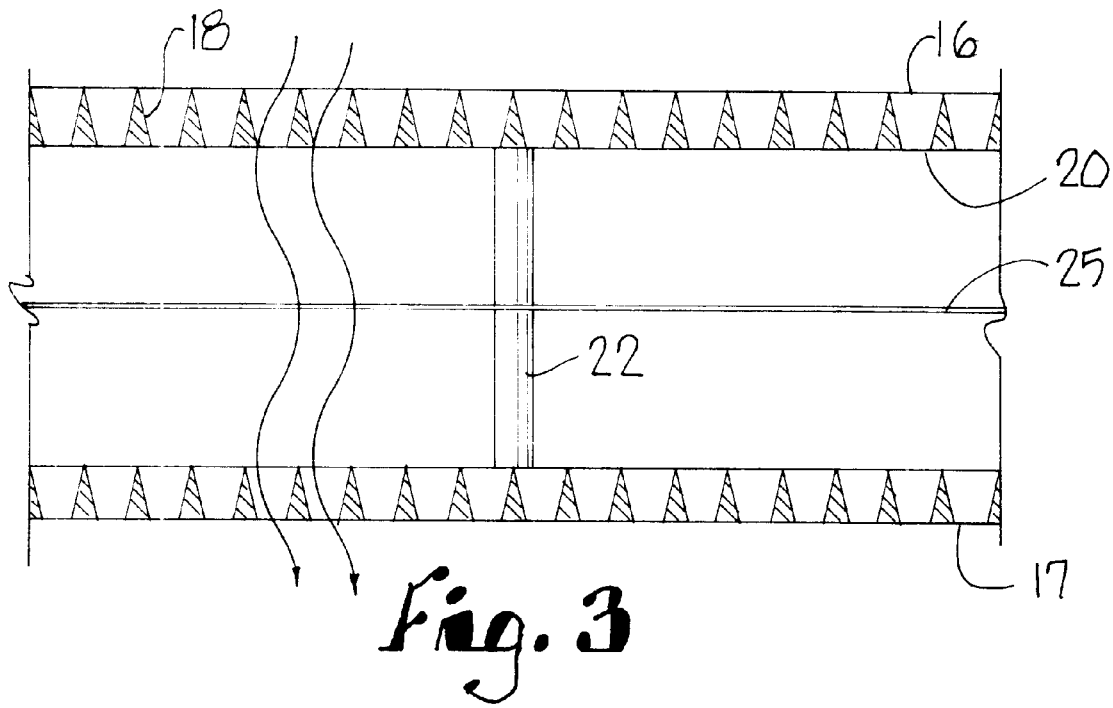
FIG. 3 is a cross sectional view of the preferred embodiment of the filter and filter holder.
Figure 4:
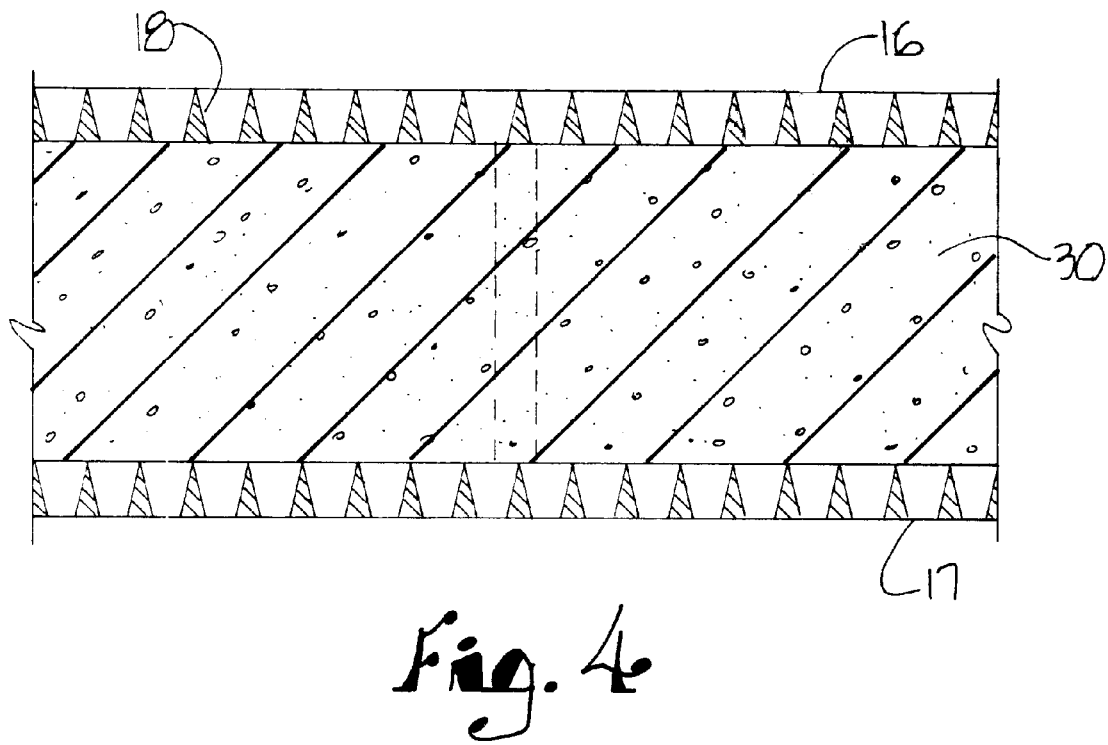
FIG. 4 is a cross sectional view of an alternate embodiment of the filter and filter holder.

An alternative form of filter 30 is disclosed in connection with FIG. 4. While the filter 25, FIG. 3, is suitable for many uses, in some situations a filter 30 of sponge-like material with fine pores may be useful and would fill the space between the upper and lower grid-like structures 16 and 17.

Other forms of filters may be used as necessary and adopted to special purposes.

Under certain circumstances, such as mopping up large particles, the support grid-like structures 16 and 17, without a middle filter element, may work satisfactorily to maintain sludge in the sump portion 9 and reduce turbulence in the upper portion 7.

It is to be understood that the disclosed embodiments are illustrative in nature and the inventor is not to be limited to any one or more embodiments except as set forth in the following claims.

What is claimed and desired to be secured by Letters Patent is:

1. A filter device for mounting within a container for cleaning liquid and comprising:
   a) upper and lower holder elements of substantially rigid construction and having a plurality of perforations therethrough for flow of liquid from an upper portion to a lower portion of said container;
   b) spacer means separating said upper and lower holder elements;
   c) a filter element positioned between said upper and lower holder elements and having a plurality of perforations therethrough, said filter element filtering out soil particles form liquid in said container as said liquid passes through said filter device and dampening turbulence in said liquid to reduce stirring up of soiled liquid collected in the lower portion of said container, said filter element being thin and of substantially less thickness than the spacing between said upper and lower holder elements so that said filter element moves freely therebetween.

2. The filter device set forth in claim 1 wherein said filter element is thin and in the order of $\frac{1}{32}$ inch thickness, said filter element being flexible to provide wavy movement between said upper and lower filter elements.

3. The filter device set forth in claim 2 wherein said filter element is of a synthetic plastic material.

4. A combined mop bucket and filter device comprising:
   a) a mop bucket having upper and bottom sump portions;
   b) a filter device mounted in said bucket and dividing said bucket into said upper and bottom sump portions, said filter device comprising upper and lower holder elements of substantially rigid construction and having a plurality of perforations therethrough for vertical flow of water, said upper and lower holder elements being separated by spacer means to provide a wide gap therebetween;
   c) a filter element which is thin and flexible positioned in said wide gap between said upper and lower holder elements, said filter element having perforations therethrough for filter flow of liquid and being flexible for wavy movement during liquid current disturbances in said mop bucket in order to dampen said disturbances and reduce any soil sediments in said sump portion from being stirred up.

5. A combination cleaning bucket and filter device comprising:
   a) a cleaning bucket having a surrounding sidewall and a bottom;
   b) upper and lower grid-like elements of substantially rigid construction and having a plurality of perforations therethrough for flow of wash water and any particles picked up during mopping;
   c) said upper and lower grid-like elements connected together in parallel, spaced, relationship and retained a gap therebetween;
   d) said upper and lower grid-like elements being positioned as a unit in said cleaning bucket above the bottom so as to vertically divide said bucket in an upper portion for retaining relatively clean wash water and a lower, sump portion for retaining soiled wash water containing suspended soil particles; the upper and lower grid-like elements reducing turbulent flow of liquid in said sump portion, the gap between said grid-like elements providing an isolation zone to reduce turbulence.

6. The combination cleaning bucket and filter device set forth in claim 5 including a thick, sponge-like filter element retained in said gap between said upper and lower grid-like elements.

7. The combination cleaning bucket and filter device set forth in claim 5 including a thin, flexible, perforated filter element set between said upper and lower grid-like elements and movable freely therebetween.

* * * * *